United States Patent
Evans et al.

[11] 3,811,252
[45] May 21, 1974

[54] AIR CLEANING DEVICE

[75] Inventors: Dewey M. Evans, Farmington; Willard L. Johnson, Huntington Woods, both of Mich.

[73] Assignee: Devansco, Inc., Huntington Woods, Mich.

[22] Filed: Apr. 12, 1972

[21] Appl. No.: 243,323

[52] U.S. Cl............ 55/228, 55/233, 55/240, 55/241, 55/248, 55/258, 55/430, 55/440, 261/109
[51] Int. Cl............................................ B01d 47/02
[58] Field of Search........ 55/430, 427.44, 229, 228, 55/226, 227, 230, 231, 233, 239, 257, 258, 259, 244, 248, 249, 250, 242, 241; 261/108, 109, 110, 111, 112, 113, 106, 105, 114 R, 119, DIG. 9; 210/298, 305, 311, 131

[56] References Cited
UNITED STATES PATENTS

| | | | |
|---|---|---|---|
| 455,893 | 7/1891 | Weisbrock | 261/114 R |
| 1,073,622 | 9/1913 | Murray et al. | 261/112 |
| 2,057,579 | 10/1936 | Kurth | 55/229 X |
| 2,585,440 | 2/1952 | Collins | 55/228 X |
| 3,036,417 | 5/1962 | Maré et al. | 261/113 X |
| 3,546,851 | 12/1970 | Hardison et al. | 55/257 X |
| 3,624,696 | 11/1971 | Cohen et al. | 261/119 X |
| 3,163,472 | 12/1964 | Zeismer | 55/434 |
| 2,831,467 | 4/1958 | Guczky | 261/DIG. |
| 3,557,535 | 11/1968 | Howick | 55/241 |
| 3,544,087 | 4/1969 | McIlvaine | 55/257 X |
| 3,063,694 | 11/1962 | Gaw | 261/DIG. 9 |
| 2,392,038 | 1/1946 | Gaylord | 55/DIG. 36 |
| 3,481,115 | 12/1969 | Evans et al. | 55/228 |
| 2,767,806 | 10/1956 | Blake | 55/223 |

FOREIGN PATENTS OR APPLICATIONS

| | | | |
|---|---|---|---|
| 1,202,704 | 12/1966 | Great Britain | 261/108 |
| 646,864 | 9/1962 | Italy | 55/257 |
| 498,585 | 12/1954 | Italy | 55/257 |

*Primary Examiner*—Frank W. Lutter
*Assistant Examiner*—Neil F. Greenblum

[57] ABSTRACT

The air-cleaning device of this invention removes particulate matter from an input air stream, and includes a wash section in which spaced apart air stream baffle members are removably adjustably and pivotally secured to supporting walls, a settling tank, a moisture eliminator section, and a suction fan section. The air stream is damped in the wash section by the baffle members so that when it passes through the moisture eliminator section, its velocity is of an order that will no longer carry particulate matter except of an extremely fine size, i.e., the particulate matter has been substantially entirely removed by the device when the air stream has cleared through the moisture eliminator section. By baffle damping the air stream flow in the wash section, the suction fan operates at full capacity and without dampering.

63 Claims, 15 Drawing Figures

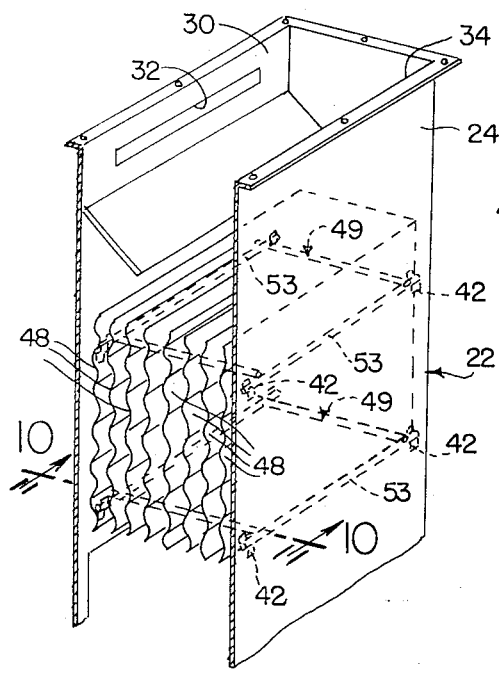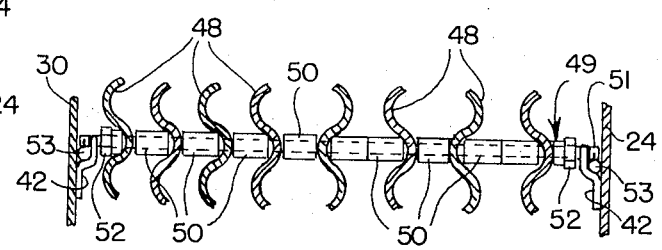
FIG. 10
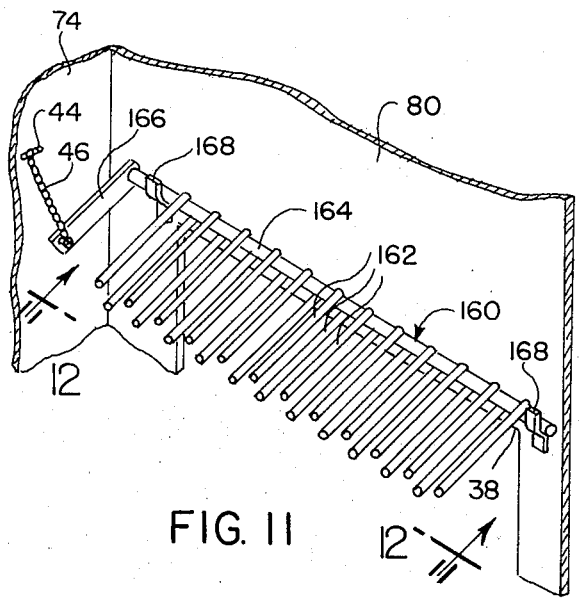
FIG. 11
FIG. 9
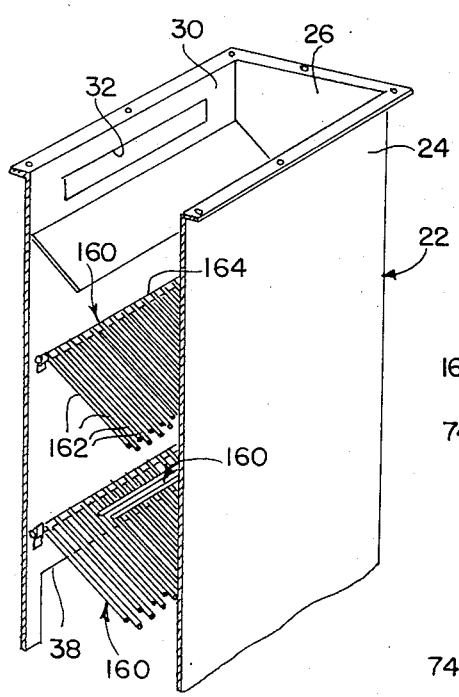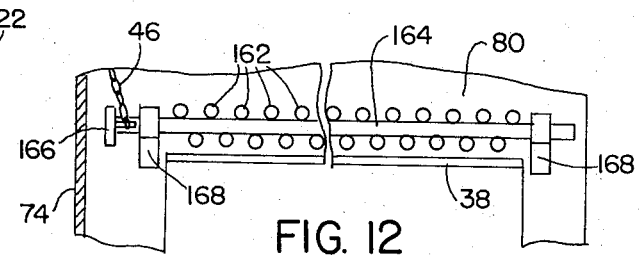
FIG. 12
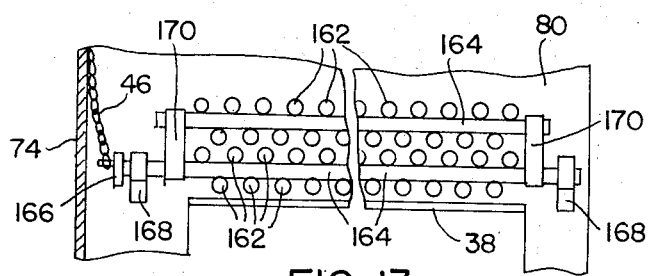
FIG. 14
FIG. 13

AIR CLEANING DEVICE

The invention involves an air cleaning device comprising but not limited to a wash section, a settling tank substantially adjacent the wash section in one preferred form or embodiment and remote therefrom in another form of the invention, a moisture eliminator section above the settling tank, and an air suction fan section connected to the moisture eliminator section for discharge of clean air. The wash section may be conjunctively arranged with the moisture eliminator section and the settling tank or it may be somewhat removed therefrom, so long as a conduit or passageway is provided for discharge of a solution-charged air stream from the wash section to the settling tank and moisture eliminator section of the device. The input of an air stream containing particulate matter to be removed therefrom is generally introduced to the input end of the wash section at negative pressure, the air stream originating in the area about machines or devices at which the particulate matter is generated and passed into the atmosphere, and is then drawn into a vent system under negative pressure having its outlet connected to the input port of the wash section of the device disclosed herein. Normally, in a unitary device, the wash section, the settling tank, the moisture eliminator section, and the suction fan section are disposed closely adjacent each other, separated by panels or walls permitting flow from one section into and/or through the next adjacent section. The air stream flow in the device of this invention is into, through and from the wash section, into and/or over the settling tank containing a substantial quantity of air washing liquid, upwardly through the moisture eliminator section, and into and through the suction fan section to a clean air discharge port. The inlet to the wash section is coupled by conventional duct means to a contaminated air conduit or manifold connected in turn to one or more of the machines at which the input air is charged with the particulate matter to be removed.

In the wash section, water or a solution of suitable chemicals adapted to intermix with, wet or entrap and remove particulate matter from the air stream is introduced to the air stream in a region substantially above the baffle members effecting air stream damping. The baffles are pivotally arranged and postured not only to effect the optimum intermixing of solution and air, but also to produce air flow damping for effective removal of particulate matter in the moisture eliminating section of the device. These baffles are removably, adjustably and pivotally secured to the walls or framing members of the wash section so that they are easily postured for optimum air flow results. Considerable turbulence is developed in the wash section by these baffles to further intermix and mingle wash solution with the air stream. The heavier of the particulate matter, encased by wash solution, drop into the lower region of the wash section and the settling tank which is provided with a sludge removing conveyor. The particulate matter may be removed by such a conveyor continuously, or it may be removed from time to time as the load in the settling tank should require. The lighter of the particulate matter carried in the solution-charge air stream is, in some measure, swept into the liquid in the settling tank where such matter may be further trapped and held, to settle to the bottom of the tank; or, the particulate matter may be carried by the air stream above the liquid level into the moisture eliminator section where the air stream flow is caused to make sharp turns between and against the faces of moisture eliminator vanes, arranged in substantially horizontal spaced apart banks above the settling tank. Upon issuing from the moisture eliminator section, the clean air stream, substantially saturated with moisture, is drawn in by the suction fan section and discharged therefrom.

The vanes in the moisture eliminator section, as described above, constitute banks of parallel spaced apart angulated vanes, substantially identical with each other, extending from one side to the other and from one end to the other of the moisture eliminator section. One bank of these vanes is disposed above a second bank of substantially identical vanes, such banks being arranged in substantially parallel relationship, or, as is preferred, at a slight angle to each other, the lower of the banks of vanes being pitched downwardly away from the wash section from which the solution-charged air stream is issuing. The advantage in angulating the lower bank of vanes is that the air stream charging across the liquid surface in the settling tank can be more uniformly distributed under and through the first bank of vanes, because the distance from the wash section discharge opening and the chamber formed by the housing, liquid surface and the first bank of vanes are functions of the pressure at which the air stream enters the first bank of moisture eliminator vanes. It has been found that a more uniform air stream distribution in this first chamber is effected by angulation of the lower bank of vanes. The upper and second bank of vanes is substantially horizonal and spaced above and away from the upper side of the first bank of such vanes to form an independent chamber in the moisture elininator section. This spacing between the two banks of vanes provides a chamber within which particulate matter may rise or be carried upwardly by the air stream, should such matter escape contact with the wet surface of the vanes, and will generally fall downwardly onto such surfaces because of the dampened velocity effected in the baffled wash section.

As an example, the input flow of air to the wash section may be of from about 2,500 to 4,000 feet per minute, increased to from about 4,000 to 20,000 fpm, in the wash section, and issuing from the bottom end of the wash section at a velocity of from about 2,500 to 3,000 fpm. After the air stream enters and passes through the banks of vanes in the moisture eliminator section, its velocity at discharge therefrom may be of from about 400 to 500 fpm. The velocity in the intermediate chamber area between the two banks of vanes is slightly less than the latter figure, and generally not enough to carry water droplets or particulate matter remaining in the air stream upwardly through the second bank of vanes; or, should such matter continue to flow with the air stream, it will become trapped upon the wet surfaces of the upper bank of moisture eliminator vanes and, in due course, be washed downwardly by the moisture impinging thereon into the settling tank.

The water solution distributor in the air cleaning device of this invention is provided with a large exit or discharge opening that will pass lint, paper, and other debris that may have been present in the input contaminated air stream initially collected in the settling tank from which the wash solution is re-circulated. A large size water distributor is preferred over a plurality of small diameter nozzles because such nozzles tend to become plugged with the dirt and debris normally found in the settling tank when the wash solution is recirculated. Where an outside source of substantially clean solution is continuously provided, other types of solution distributors may be considered and used.

Industrial air cleaning devices to the present time have not generally been provided with large clear panels for observing and inspecting the cleaning operation of the device. When such optically clear panels are embodied in easily and quickly removable access doors, they provide visibility as well as facile access to the interior of the air cleaning device for low cost and prompt maintenance. Many such devices now in use have complicated interior constructions that quickly load up with particulate matter removed from the air stream, cutting down on the air volume discharged from the device, and consequently reducing the amount of air available to efficiently exhaust the particulate matter generated at its source, i.e., at the machines from which the air stream is drawn.

In practice, industrial air cleaning devices must accept and dispose of many articles not considered to be part of the primary soil loading, including newspapers, articles of clothing, cleaning cloths, lunch papers, sweepings, and many other bits of debris present about or at the machine or machines from which the air stream is generated. The air cleaning device of this invention is most suitable for sustained air cleaning efficiency because it has a substantially uncomplicated interior construction that does not allow for a build-up or collection of debris; it has a high visibility function in that all operating areas are visible from outside the device, at all times, for monitoring performance of the wash section and moisture eliminator section by operators, area workers and management. Large openings of easy access are provided in the device to all areas, whereby maintenance and service can be quickly and easily effected and performed. Such maintenance can be made without directly entering into the air cleaning device or climbing ladders onto or upon it. Since access is provided at floor level, accumulated pockets of soil can be flushed by a water hose from the moisture eliminator section or from the wash section baffles directly into the settling tank, which is served by a sludge conveyor. Additional monitoring equipment to be provided on commercial embodiments of the device include an ammeter for indicating the performance of the suction fan motor, so that a drop in the volume of air being handled through the device is immediately reflected by the indicator on the ammeter, and a manometer or other suitable device to measure the static pressure at the wash section inlet, a pressure drop across the wash section, a pressure drop across the moisture eliminator section, and the static pressure at the inlet to the suction fan section.

Since the objective of any good air cleaning device should be to operate with sustained efficiency at a rated volume, velocity and pressure, the device of this invention, due to its simplicity of construction, does in fact operate at sustained efficiency for a longer period of time and with greater ease in the performance of its required service functions.

Washing efficiency can be compared to a device such as a truck speeding along a highway. While pushing a mass of air in front of itself, the truck also creates a partial vacuum behind itself, and an object moving within the region of such partial vacuum does so with less effort and at substantially the speed of the moving truck. Similarly, a drop of water speeding through the air pushes a cushion of air ahead of itself while generating a partial vacuum behind itself. Since the drop of water is very large with respect to the size of a small particulate dust particle, it is the theory of many that the particle is deflected by the cushion of air ahead of the water droplet, or is drawn into the partial vacuum behind it. To effect washing efficiency, the article must be trapped by the water droplet and then the droplet must be impinged on some surface where the water and particle can flow by gravity or other force into the settling tank.

By the air cleaning device of this invention, water or wash solution is introduced so that it moves transversely into the flow of the incoming air stream, the particulate matter, in distinct particles, being drawn into the partial vacuum generated by the droplets produced by wash solution turbulence and intermixing in the wash section. The distinct particles are trapped by the solution droplets as they move substantially together toward the discharge end of the wash section, the moisture-laden particles being carried either directly into the settling tank or against and upon the surfaces of the moisture eliminator vanes in that section above the settling tank.

It is therefore a principal object of the invention to provide a wash section in an air cleaning device having adjustably removable baffles for an air stream containing a water or wash solution to produce a dampening effect upon the volume of the input air stream in the wash section of the air cleaning device, and increasing the volumetric capacity of the moisture eliminator section into which the moisture-laden particulate matter is discharged therefrom, so that as the moisture saturated air stream passes through the device, it will flow at a gradually decreasing velocity. Another object is to provide a wash section which may be disposed closely adjacent complementary sections of the air cleaning device or at a position remote from such sections. A further object is to provide a simple construction in an air cleaning device whereby an input air stream passes through a baffled wash section and into the region of a settling tank and a moisture eliminator section for discharge therefrom into an air suction section containing a suction fan, whereby the flow path of the moisture saturated air stream, though convoluted, permits of a relatively straightforward simple uncomplicated construction. A further object is to provide at least two vertically substantially spaced apart horizontal banks of moisture eliminator vanes in that section of the air cleaning device, the lower bank of vanes being preferably inclined downwardly away from a line over the air stream input end of the section, and over and spaced above the liquid level in the settling tank therebelow, in order to effect a substantially uniform distribution of the moisture-laden air stream issuing from the wash section and into and through the moisture eliminator section. Still another object is to provide angulated moisture eliminator vanes in vertically spaced apart banks of such vanes whereby the air stream is required to flow between and against surfaces of the vanes at reduced velocities in its passage therethrough, for more efficient collection of particulate matter entrained in the air stream. Still another object is to dampen the inflow volume of the air stream in the wash section, so that the velocity of the air stream in the enlarged open regions of the moisture eliminator section, and particularly intermediate and above the upper and lower banks of moisture eliminator vanes, is of such an order that substantially all, or at least most of the particulate matter entrained in the air stream is moving at a velocity such that the vast majority of distinct particles will be impinged upon or fall back onto the surfaces of the banks of vanes from which they are removed by gravity moisture flow into the settling tank therebelow.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIGS. 1 and 2 are perspective views of one form of an air-cleaning device embodying the invention herein disclosed, taken from both ends of a preferred embodiment of the device.

FIGS. 5-9 inclusive are fragmentary perspective views of wash sections in which the baffle members are transversely arcuately formed, perforated, screened, corrugated longitudinally and arranged horizontally pivotally along one longitudinal edge, and corrugated longitudinally and disposed vertically, respectively, in the wash sections.

FIG. 10 is a fragmentary transverse vertical sectional view taken substantially on the line 10—10 of FIG. 9.

FIG. 11 is a fragmentary perspective view taken from inside the moisture eliminator section in the direction of the air comb.

FIG. 12 is a view looking toward the lower ends of the air comb rods, substantially on the line 12—12 and in the direction indicated in FIG. 11.

FIG. 13 is a view similar to FIG. 12, illustrating a slight modification in the provision of a plurality of banks of air comb rods.

FIG. 14 is a perspective view similar to any of FIGS. 5-9 inclusive, illustrating the air combs of FIG. 11 arranged as baffles in the wash section.

Figure 15:
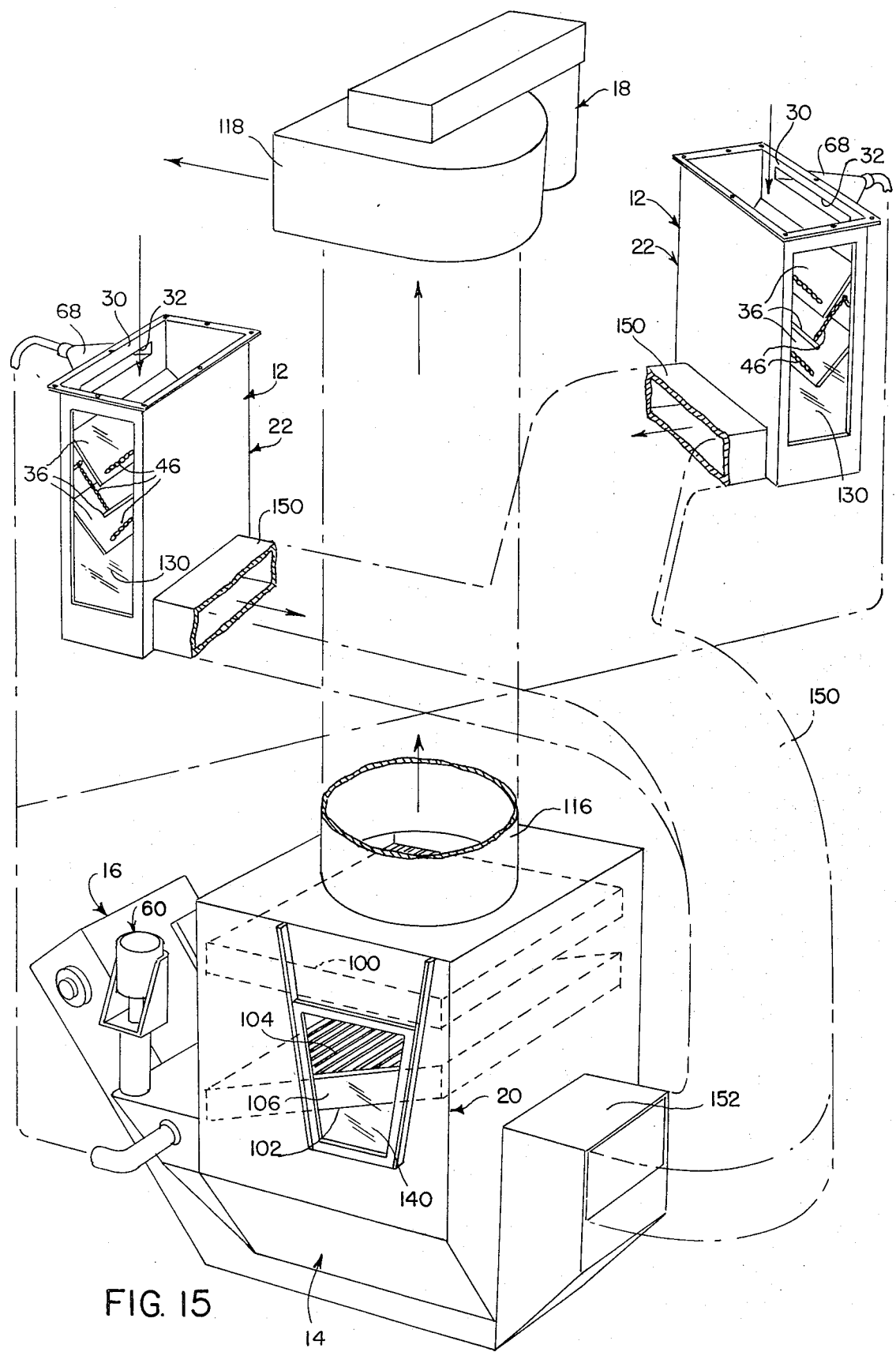

FIG. 15 is a perspective view of another preferred embodiment of the invention, in which a plurality of wash sections are connected to and communicate with a single settling tank and moisture eliminator section served by a single suction fan section.

As illustrated particularly in FIGS. 1-4 inclusive, showing one preferred embodiment of the invention disclosed herein, the unitary air-cleaning device or apparatus 10 comprises a wash section 12 receiving the "dirty air" or the contaminated air stream input to the machine, a settling tank 14 embodying a sludge conveyor section 16 connected thereto and communicating therewith, and a suction fan section 18 discharging substantially clean air from a moisture eliminator section 20 disposed above and communicating with the settling tank.

The wash section 12 comprises a sheet metal housing 22 having a front wall 24, lateral side walls 26 and 28, one or both of which can be provided with a window therein for visual inspection of the washing function, and a rear wall 30, which may be common with a wall of the housing defining the moisture eliminator section and settling tank or may be independent thereof. The wash section 12 further comprises an inlet opening 32 in the rear wall 30 for discharge therethrough of water or washing solution into the wash section 12 in the uppermost region thereof and closely adjacent the air stream input opening 34 at the upper end of the wash section, discharge from the wash section and below the baffle members 36 being made through a discharge opening 38 below the rear wall 30 and communicating with the moisture eliminator section 20 and the settling tank 12. A bottom wall 40 for the wash section 12 closes off the lower end thereof, and also connects with the bottom wall or optionally an adjacent side of the settling tank 14.

The wash section 12, in which the dirty air stream is first received, containing particulate matter to be removed by the machine 10, is served by a source of water, or an air wash solution containing one or more chemicals or additives particularly adapted to wet, encase, entrap or entrain the particulate matter injected forceably into the wash section and transversely against and through the air stream input, generating considerable turbulence therewith. Baffle members 36 are pivotally supported on the rear and front walls 30 and 24 respectively of the wash section in spaced apart attitudes such that the moisture-laden air stream makes a convoluted course through the wash section downwardly from the input end 34 to the discharge opening 38.

The front and rear walls 24 and 30 of the wash section are substantially parallel, as are the lateral side walls 26 and 28. The bottom wall 40 is somewhat inclined downwardly from the bottom edge of the front wall 24 which does not extend vertically to the floor plane upon which the machine or apparatus 10 rests. The lower end of the rear panel or wall 30 extends downwardly to a line substantially above the water line W in the settling tank 14, so that there is an open free space above the water or wash solution surface for discharge of the moisture-laden particulate matter and air stream from the wash section either into the liquid in the settling tank and the wash section next thereto adjacent, or into the moisture eliminator section 20 above the settling tank 14.

The front and rear walls 24 and 30 of the wash section 12 are provided with a plurality of baffle supporting brackets 42 adjacent each side edge thereof, upon which the baffle members 36 are pivotally secured at their upper edges, for angular adjustment of the baffle plates (with respect to their supporting walls) into postures whereby free flow of the moisture laden input air stream through the wash section is impeded and restricted, increasing the velocity of the air stream therethrough.

The front and rear walls 24 and 30 respectively are also provided with a plurality of pins or hooks 44 secured thereto and adapted to engage and secure links of chain 46 which adjustably pivot the baffle plates 36 upon their brackets 42 into postures that control the air stream flow through the wash section 12 to desired or required volumes and velocities. It will of course be understood by persons skilled in the art to which the invention pertains that the number of such baffle plates 36 may be increased or decreased from the number described and illustrated herein, and that the arrangement and number of supporting brackets and pins to support, engage and secure the ties for the lower ends of the baffle plates may also be arranged in closer or more spaced apart vertical position on the front and rear walls 24 and 30 respectively than as is herein described and illustrated, in order to achieve the desired or required air stream flow. Although the lower ends or edges of the baffle plates 36 are herein described and illustrated as being tied by link chains 46 to the pins 44, other tying means such as cable, mono filament wire or other suitable means, may also be utilized for supporting the baffle plates 36 in the postures desired or required. Such means as are suitable for pivoting support of the baffle plates are generally conventional and well known in the art and may be selectively utilized with the baffle plates 36 in wash section 12 for such purpose.

Figure 1:
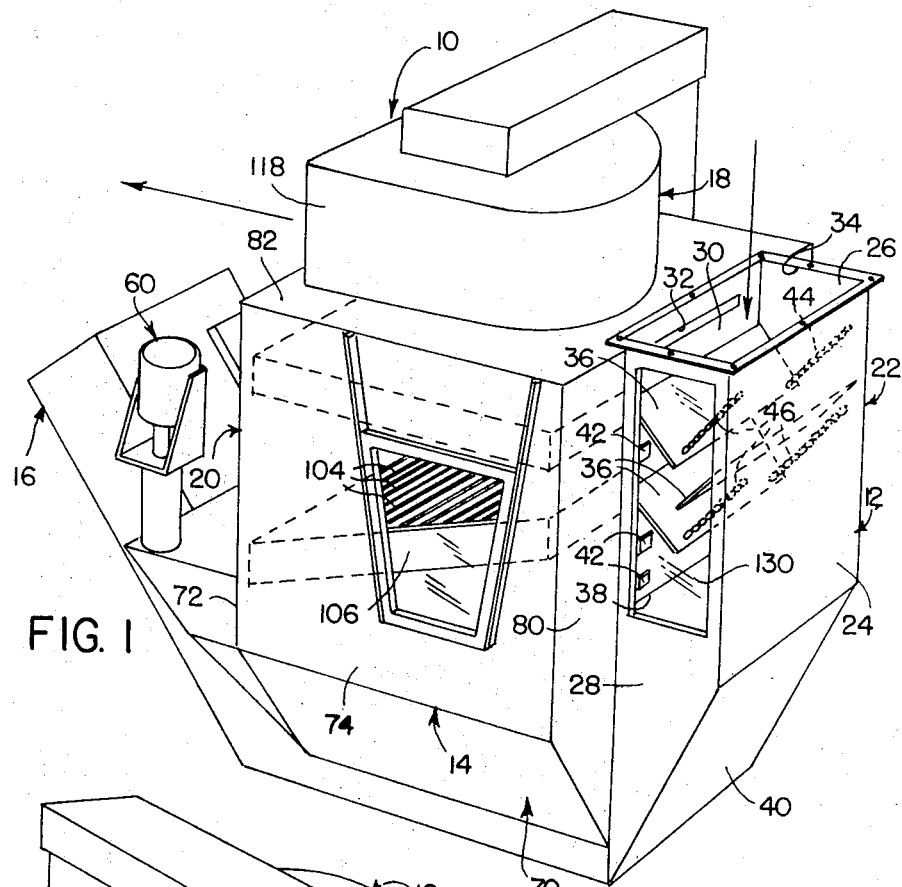
Figure 2:
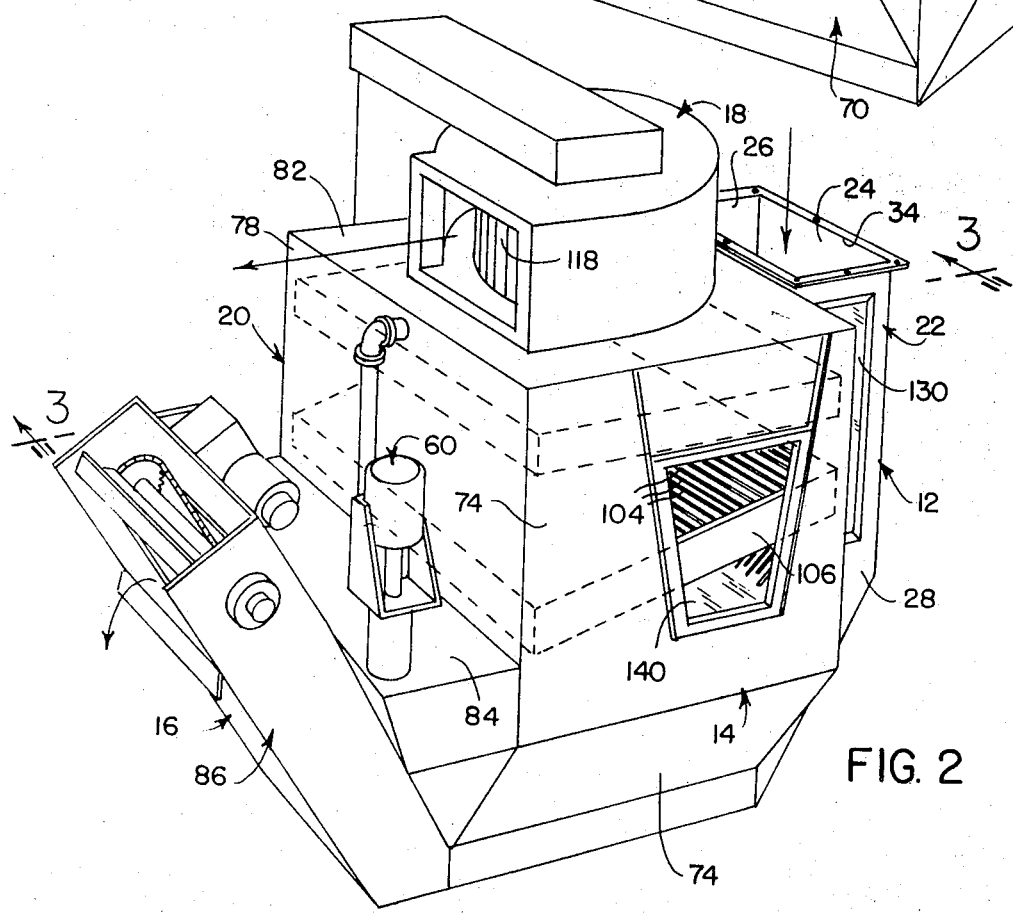
Figure 3:
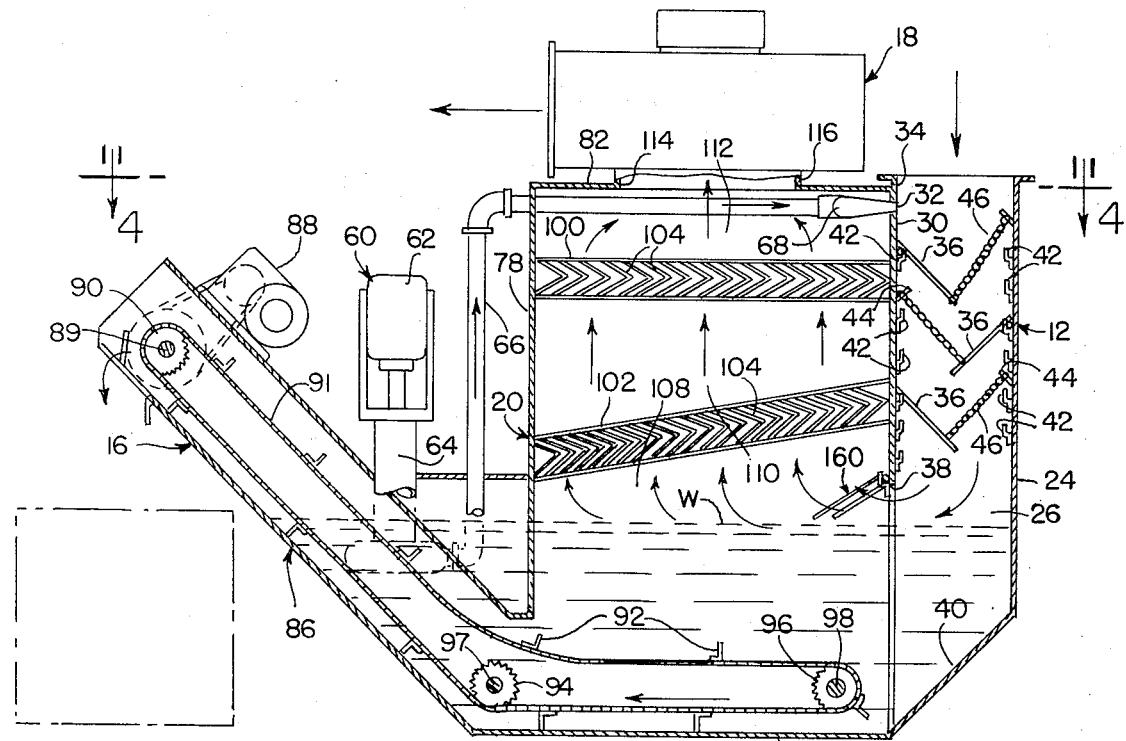
FIG. 3 is a vertical longitudinal extending sectional view taken substantially on the line 3—3 of FIG. 2.
Figure 4:
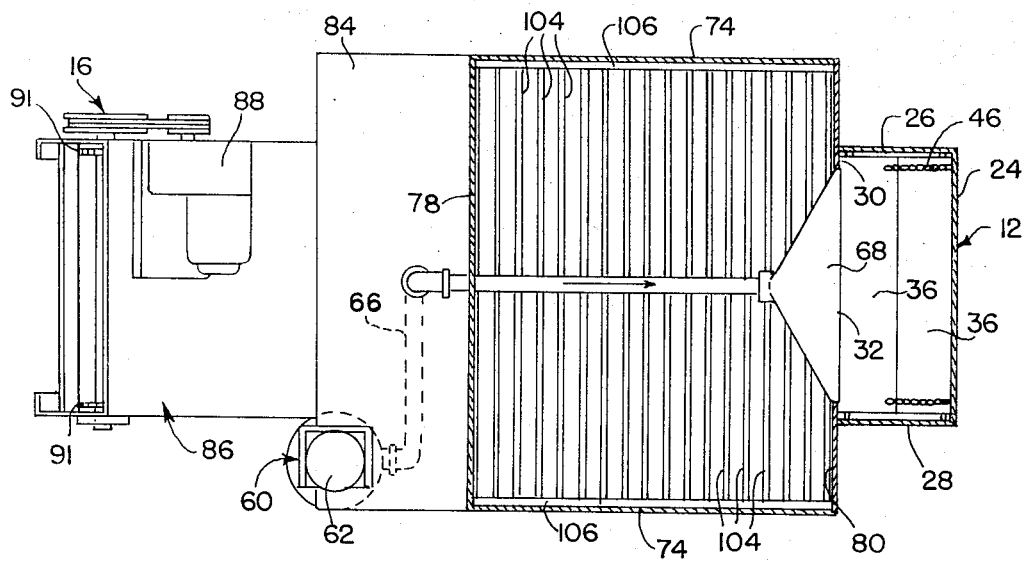
FIG. 4 is a horizontal, substantially plan view, taken substantially on the line 4—4 of FIG. 3.
Figure 5:
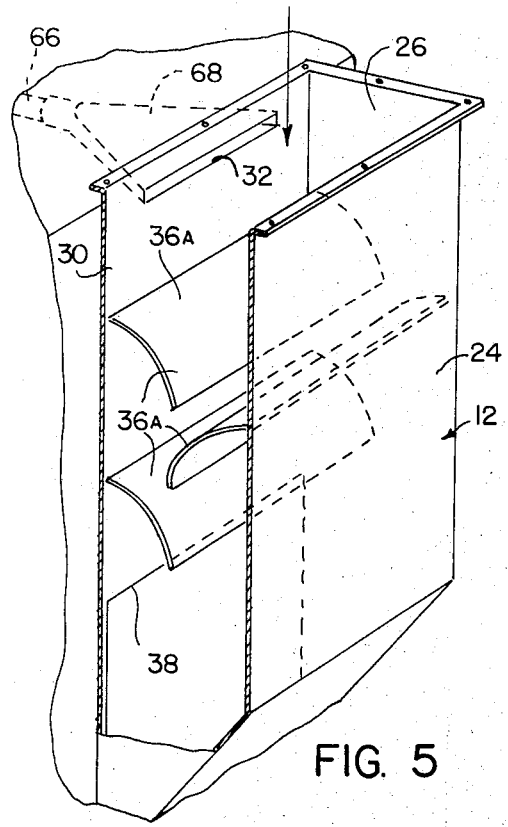
Figure 6:
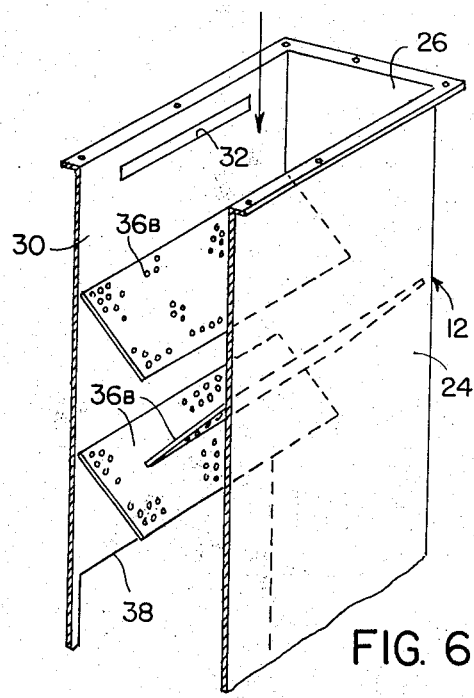
Figure 7:
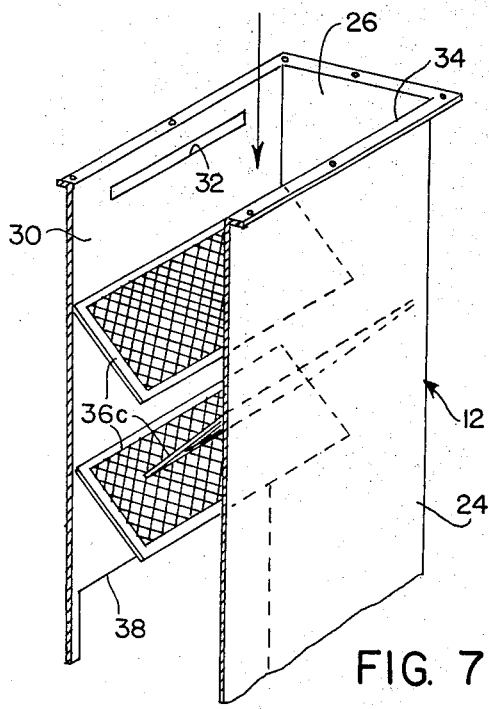
Figure 8:
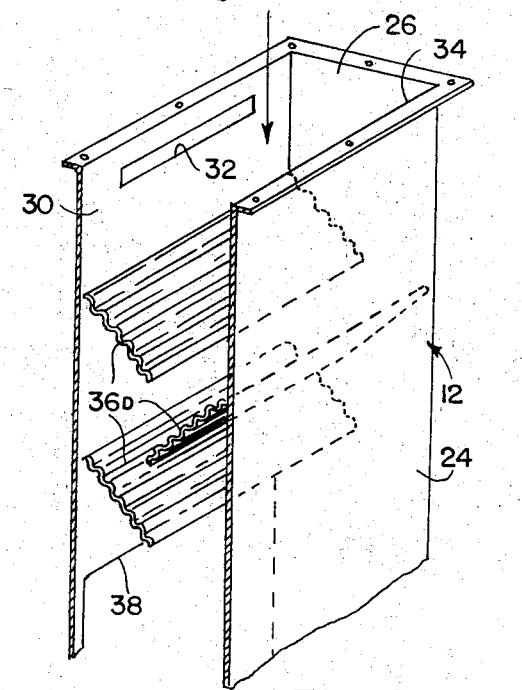

In this connection, various forms of baffle plates which can be utilized in wash section 12 are illustrated in FIGS. 5–9 inclusive. For example, transversely arcuately curved baffle plates 36A are illustrated in FIG. 5, and perforated baffle plates 36B in FIG. 6. The baffle plates may also take the form of planar screens 36C (FIG. 7), the openings therethrough being of relatively larger or smaller size as the particular specifications for air flow may require, and longitudinally corrugated baffle plates 36D are illustrated in FIG. 8.

It will be noted that in the several views of the wash section, FIGS. 5–8 inclusive, the vertically arranged supporting brackets and pins, 42 and 44 respectively and the tying chains or members 46 have been omitted in order to more clearly illustrate the several forms of baffle plates that can be utilized in wash section 12. Further, although the baffle plates illustrated herein throughout are shown disposed at an angle substantially at 45° to the vertical, such angularity is modified as desired or required in order to effectively control the volume and velocity of input moisture laden air stream flowing through the wash section 12 and the moisture eliminator section 20. For instance, the baffle plates may be pivoted downwardly to allow for more free flow of the air stream, or pivoted upwardly for a more restrictive effect upon that air stream.

Longitudinally corrugated baffle members 48, FIG. 9, are disposed vertically and substantially in parallel with each other between side walls 26 and 28 of the wash section housing 22. The corrugations run horizontally and can be disposed in the same attitude, as shown by the bank of baffle members at the left in FIG. 9, or in opposing relationship as at the right in the same view. The baffle members are secured in vertical posture by connecting and supporting members of any suitable type or style, one arrangement being the threaded rod and tubular spacer fasteners 49, by which the spacers 50 through which rods 51 extend space the baffle members 48 apart from each other. Threaded nuts 52 secure these baffle members together in a bank upon the rods. The fasteners 49 are preferably disposed adjacent upper and lower corners of the baffles 48 at each end thereof, the ends of the rods 51 being suitably secured to horizontally disposed support bars 53, 53 that rest in the brackets 42 secured to the front and rear walls 24 and 30.

The wash section 12 is served with water or wash solution forceably discharged through the opening 32 in the rear wall 30 by pump means 60 comprising a motor driven pump device 62 communicating through a conduit 64 with the water or wash solution below the liquid level in the settling tank 14 and by a discharge conduit 66 terminating in the discharge nozzle 68 that communicates with the opening 32 in housing 22 of wash section 12. The pump unit 62 discharges water and/or wash solution received from the settling tank through the discharge nozzle 68 at a relatively low velocity such that when the liquid makes transverse contact with the input air stream, considerable turbulence is generated and the liquid particles are broken up into a fine spray trapping particulate matter in the air stream and surrounding such particles with a moisture shell.

The input air stream, substantially free of moisture before it enters the wash section 12, apart from ambient moisture, flows at a velocity of from about 2,500 to 4,000 feet per minute. When the particulate matter in the air stream is struck by the wash solution issuing from openings 32 and becomes enveloped with a moisture shell, the turbulent flow impinges upon the surfaces of baffle plates 36 (or any of the other forms of baffle plates which may be selectively utilized). Much of the moisture in the air stream will impinge upon the baffle plates and flow in droplets or coursing liquid downwardly into the liquid collected in the settling tank and the bottom portion of the wash section. Once the particulate matter is in the settling tank, it will generally drop through the liquid medium to the bottom of the wash section and the settling tank for pick-up by and discharge from the sludge conveyor to be described hereinafter.

The settling tank 14 forming a component of the air cleaning device 10 comprises generally a lower liquid containing tank 70 (the moisture eliminator section 20 being disposed thereabove) in which the sludge conveyor section 16 is operative and to which the latter is directly connected. The housing 72 defining these components is generally of sheet metal and forms suitable chambers for containing the wash solution and sludge received and collected from the wash section 12 in its lower portion and the continuing air flow units upper portion. The housing 72 may be substantially rectilinear as illustrated, or may take any other suitable form. In any event, the housing 72 for the settling tank 14 and the moisture eliminator section 20 generally comprises outer side walls 74, 74, a bottom wall 76, front and rear walls 78, 80 respectively (the latter being common with the wash section rear wall 30 in the embodiment illustrated in FIGS. 1–4 inclusive, or being supplementary thereto as desired or required), a top cover plate 82 over the moisture eliminator section 20 and a top cover plate 84 extending from the moisture eliminator section forward of the front wall 78 to the housing 86 of the sludge conveyor section 16.

The air comb 160, shown particularly in FIGS. 11 and 12, is designed to catch lint and paper issuing from the lower end of the wash section 12 as the air stream leaves the exit opening 38. The air comb is disposed at an angle to the vertical such that solid particulate matter trapped by the air comb rods 162 will agglomerate thereon and be forced from the rods in clumps or bunches into the liquid in the settling tank 14 by the high velocity air stream and water action.

The air comb 160 comprises the rods 162 fixedly secured at their proximal ends to a rod, bar or pipe member 164 so as to project therefrom at right angles from above and below the bar member 164 in staggered relationship as shown, or at any other suitable angle whereby the air flow therethrough will be convoluted, the rows of rods 162 being spaced apart from each other a distance such that agglomeration of solid and particulate matter will not clog and close the spaces therebetween to shut off the air stream flow therethrough. A lever member 166 is affixed to one end of the rod 164, or alternatively it may be secured thereto inwardly of the end of rod 164, for pivoting the air comb. The ends of the rod are pivotally arranged in bracket supports 168, 168 mounted on the wall 80 of the moisture eliminator section 20 adjacent opening 38. A chain-type lift member 46 is affixed to the distal end of lever member 166 for pivoting the air comb into the desired or required angular posture, and a chain engaging pin or hook 44 is affixed to the adjacent lateral wall 74 for securing the chain. Of course, other suitable means for pivoting the air comb and securing it in the desired posture can be employed.

As shown particularly in FIG. 13, several banks of comb rods 162 can be combined by connecting bars 170 secured to and securing the bar members 164 into a unit, to pivot on brackets 168, 168, to provide a convoluted air flow into the moisture eliminator section and thereby to trap solid and particulate matter upon the comb rods 162. A single pivoting lever 166 is secured to one or more of the supporting rods 164 as may be required, the number of such layers of rods 162 being selected to suit the needs of particulate applications in which the air cleaning device 10 is designed for use.

The air comb 160 can be also utilized as an alternate baffle member, FIG. 14, in the wash section 12, being angularly postured by the lift chain 46 engaged upon pin or hook 44 to any suitable angle for restricting air flow through the wash section from its input end 34 to its discharge end 38. When so arranged, the contaminated input air stream, now intermixed with water or wash solution issuing from the nozzle 68 through opening 32, is given a tortuous path through the comb rods 162, restricting air flow and effecting a wetting action of the wash solution upon particulate matter in the air stream.

The sludge conveyor section 16 is of generally conventional construction and comprises generally the sheet metal housing 86, a motor drive 88 chain-connected to a conveyor drive shaft 89 and sprockets 90 about which are arranged two strands 91, 91 of chain supported scraper flights 92 which are supported additionally upon rotatable pairs of idler sprockets 94, 96, mounted on shafts 97, 98 respectively in the bottom region of the settling tank 14 above the bottom wall 76.

The moisture eliminator section 20 embodies preferably at least two banks 100 and 102 of moisture eliminator vanes 104, arranged substantially horizontally and spaced vertically apart from each other above the water line in the settling tank. Where the distance between the side walls 74, 74 is substantial, aligned sections of the vanes 104 are utilized and supported medially as well as at the side walls 74, 74 in suitable longitudinally extending channel members 106, or by other suitable means. As illustrated particularly in FIG. 4, the upper bank 100 of moisture eliminator vanes extends between the channel members 106, 106 secured to the lateral walls 74, 74. Should the distance between such walls be as much as 3 or 4 feet, it would be desirable to provide medial parallel and aligned supporting members for sections of the vanes 104 central of the section to provide adequate support for these vanes.

The lower bank 102 of the moisture eliminator vanes is illustrated as being slightly inclined downwardly from the rear wall 80 to the opposite front wall 78. This orientation is particularly recommended when the velocity of the moisture-laden air stream discharged from the wash section 12 through opening 38 into the moisture eliminator section is substantially high, i.e., of the order of about 3,000 feet per minute. When the velocity is substantially of this order, a more uniform distribution of the air stream through the first bank 102 of moisture eliminator vanes is achieved by inclining this bank of vanes downwardly toward the far side of the moisture eliminator section 20. Such angulation provides a first enlarged open space or chamber immediately beyond the opening 38, above the water line, toward a more restricted space for air flow at the far end of the section 20 adjacent the front wall 78. The degree of such angulation is readily determined upon metering the velocity of the air flow in the moisture eliminator section in the open regions adjacent and below the lower bank 102 of vanes. By such metering, angulation of the first bank of vanes can be more precisely determined and adjusted to achieve the required or desired uniform distribution of air flow therethrough.

The banks 100 and 102 of the moisture eliminator vanes 102 define, with side walls 74, 74 and opposing front and rear walls 78, 80, lower, intermediate and upper air stream chambers 108, 110 and 112 respectively in the moisture eliminator section 20. The air flow from the wash section issuing from opening 38 enters the lower chamber 108, passes through the first bank 102 of vanes, the intermediate chamber 110, through the upper bank 100 of vanes into the upper chamber 112 which is provided with a discharge opening 114 communicating with an air suction section conduit 116.

The top plate 82 of the moisture eliminator section 20 is provided with the discharge opening 114 communicating with the conduit 116 connected to the suction fan section 18 which has a motor driven fan unit 118 suitably housed and mounted upon the top plate of the moisture eliminator section 20.

The vanes 104 are spaced rather closely together, i.e., approximately 2–2½ inches, and in parallel orientation, with their angulations arranged such that the line of sight transversely through the vanes is broken by the sides or legs of next adjacent vanes. Further, the direction of the angulated vanes 104 is such that when the air flow from the opening 38 and in the chamber 108 reaches below the first bank 102 of vanes, the flow of moisture laden air and particulate matter impinges first upon the surfaces of the lower legs of the vanes, making a sharp turn and a reverse course between the vane surfaces to the medial portion thereof, with another reverse turn at the apex of the angle and between the upper surfaces of adjacent vanes before exiting from the bank 102 into the chamber region 110.

Side wall 28, and optionally side wall 26, of the wash section housing 22, is provided with a window 130 for visual inspection of the wash section during operation of the machine 10. A window 130 is suitably framed and removably mounted in the wall and sealed against loss of moisture and air. A second similar inspection window 140 is provided in one or the other, or both of the side walls 74 in the moisture eliminator section 20, for similar observation of the functional operation of the section. The windows 130 and 140 may be removably secured as recommended, or fixedly secured to their respective supporting walls.

As previously described, the wash section 12 can be affixed directly to the settling tank and moisture eliminator sections 14 and 20 respectively, as disclosed, or at either end thereof, or optionally a plurality of wash sections 12 can be mounted and suitably supported at positions remote from the settling tank and moisture eliminator section, as can be the suction fan section 18. Such an arrangement of related components is illustrated in FIG. 15, where it will be observed that a plurality of wash sections 12 are each provided with wash solution discharge nozzles 68, and lower air stream outlet ports communicating with an inlet conduit 152 and its port into the settling tank 14 and the moisture eliminator section 20. The wash section 12 may be positioned closely adjacent the machines or regions from which contaminated air or air containing particulate matter to be cleaned and removed from the air stream is drawn. The settling tank and the moisture eliminator section can be positioned upon the floor of a plant in which air cleaning by the apparatus hereindisclosed is required. The suction fan section 18 can be supported and mounted by and upon suitable means substantially above the moisture eliminator section 20, i.e., several feet thereabove, and in some instances closely adjacent the roof section of the region in which the settling tank 14 and the moisture eliminator 20 are located for connection to the latter by means of an elongated connecting conduit 116. The moisture laden air stream discharge conduits 150 issuing from the lower ends of and communicating with the wash sections 12 can be connected to an intermediate manifold or merge for connection to and at the inlet conduit 152 communicating with the settling tank 14 and the moisture eliminator section 20, as may be preferred or required.

In operation, the air cleaning apparatus 10, whether in the form illustrated in FIGS. 1–9 inclusive, or in the embodiment illustrated in FIG. 15, forms its air cleaning function in the following manner. Contaminated input air, containing particulate matter to be removed therefrom, is introduced to the wash section 12 preferably by a conduit (not shown) connected to its input end 34 and communicating therewith at an input velocity of from 2,500 to 4,000 feet per minute. Wash solution is continuously discharged transversely into the air stream in wash section 12 through opening 32 under pressure, from pump 62, through conduit 66 terminating in nozzle 68. The shape and form of this nozzle may be as shown or may be in any other suitable form whereby wash solution or water is discharged through an opening or openings in the wall 30 of the wash section, such liquid being forcefully discharged in droplets, mist, or other desirable liquid form, transversely into and through the downwardly flowing input air stream. Intermixing of the air stream and particulate matter entrained therein with the moisture of the wash solution commences almost immediately upon their impingement and collision. The moisture laden air stream is drawn down, by the suction fan 118, into and through the wash section, against the exposed surfaces of the baffle plates 36 in the flat planar form as shown, or in any of the alternate forms illustrated in FIGS. 5–9 inclusive, or in any other desirable form whereby the moisture laden air flow is convoluted in its passage through the wash section 12, so as to impinge upon the baffle surfaces, restricting the volume of air flow therethrough while increasing its velocity. Considerable turbulence is created by the baffling in the wash section, and this turbulence of moisture and air stream results in very fine intermixing of the moisture particles with the particulate matter to wet and encase the solid particles with an outer shell of moisture. Impingement upon the surfaces of the baffle plates results in an accumulation of the particulate matter and its discharge in larger droplets of wash solution into the liquid in the settling tank 14 and in the lower portion of the wash section 12. The particulate matter then generally settles to the bottom of the settling tank and is carried upwardly away by the sludge conveyor flights 92, which are rotatively driven about the sprockets 90, 94 and 96 by the chain engaged motor drive 88, to the discharge end of the sludge conveyor 16.

A certain amount of the particulate matter, in distinct particles, sometimes become encased in aerated moisture bubbles which float upon the surface of the liquid in the settling tank 14. However, the volume and velocity of the moisture laden air stream issuing from the wash section 12 through opening 38 are generally such that the surface and a substantial portion therebelow of the liquid in the tank section of the settling tank is violently agitated, whereby most all of the particulate matter entrapped in such bubbles on the surface are finally wet and sink to the bottom of the settling tank 14.

As to the air stream that passes upwardly above the liquid line into the chamber area 108 of the moisture eliminator section 20, such air stream is caused to be substantially uniformly distributed from one end of the chamber to the other and transversely across by virtue of the angulated lower bank 102 of moisture eliminator vanes 104. By virtue of the direction of the spaced apart parallel angulated vanes 104, the air stream is caused to make at least two reverse bends in its flow from chamber 108 to chamber 110, and in this convoluted flow, a considerable amount of the moisture-shrouded particulate matter is caused to impinge upon the surfaces of the vanes, whereby they are accumulated in droplets and fall or flow downwardly into the liquid in the settling tank. As to the particulate matter which is carried upwardly into and through the intermediate chamber 110, the second bank of vanes also causes a convoluted flow between the spaced apart angulated vanes of the upper bank 110 so that if the particulate matter reaches the surfaces of this bank of vanes, the moisture enshrouded distinct particles will impinge upon such surfaces, collect in droplets and fall by their own weight onto the lower bank 102 of vanes and from there into the liquid in the settling tank. As the air stream flows from the lower chamber 108 into the intermediate chamber 110 and then into the upper chamber 112, a velocity through the opening 38 of approximately 3,000 feet per minute could well be reduced in the chamber 112 immediately above and adjacent the upper bank 100 of moisture eliminator vanes to a velocity of about 450 feet per minute, and as the air stream enters the conduit 116 and the suction fan 118 the velocity is gradually increased to substantially the fan velocity.

It will be observed that the suction fan, operating at full capacity, undampered at either its inlet or its outlet, draws the input air stream through the wash section 12, where its volumetric flow is dampered, and into and through the moisture eliminator section which is relatively undampered, at a progressively and sequentially reduced velocity. By adjustably pivoting the baffle members 36, in any of its forms, dampering of the input air stream in the wash section 12 initiates a reduction in air flow through the apparatus 10 so that substantially clean air issues from the upper bank of moisture eliminator vanes, substantially all of the particulate matter having been eliminated and removed by the wash solution first introduced through the nozzle 68, or its equivalent. Utilizing the full rated capacity of the motor driven suction fan 118, without dampering at the input or discharge end of the fan, materially improves the efficiency not only of the fan unit but of the entire apparatus, results in a simplified construction, reduces the cost of its maintenance, and effectively controls the air flow into and from the wash section and the moisture eliminating section. The structural simplicity of the components of the machine lends great adaptability to industrial/commercial applications and modifications such as are illustrated in FIG. 15 and described hereinabove, wherein a plurality of wash sections are spaced about at positions remote from but communicating with a single settling tank and moisture eliminating section served by a suction fan section at a position substantially removed from the moisture eliminator section.

Although the components organized into the combinations herein disclosed and claimed are generally conventional, it should be noted that moisture eliminator vanes of metal, plastic or other suitable materials can be produced and are presently available in sections for mounting in their frame members 106. Most of the remaining components of construction for the various sections of the air cleaning apparatus are made of metallic, plastic or other suitable materials designed and having particular advantages for service in the various sections of the device. The housings for the wash section, settling tank and moisture eliminator sections can be built of plastic, fibreglass or other suitable non-metallic materials, as well as of suitable metals. Such material specifications in view of the disclosure herein given will be readily apparent to persons skilled in the art to which the invention pertains.

While not specifically illustrated or described herein, the removable windows 130 and 140, which are of glass or plastic, can provide ready-access openings for maintenance purposes, and additional access doors are and can be placed in the wash, moisture eliminator, settling tank, sludge conveyor and suction fan sections as may be required or desired. Such access openings, of course, are provided with suitable seals to maintain and support the functional purposes and operation of the air cleaning apparatus of this invention.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

We claim:

1. In an air cleaning apparatus for removing solid and particulate matter from a contaminated air stream introduced to the apparatus at a relatively high input velocity by comparison to the relatively low input velocity of wash liquid injected into said air stream in said apparatus, the combination comprising a wash section comprising a housing having conjoined front, rear, bottom and lateral walls, an input opening at the upper end of said housing for said contaminated air stream and an opening adjacent the lower end of said housing through a wall thereof for discharge of said air stream and wash liquid introduced into said wash section, a wash liquid opening through and extending substantially the entire width of a wall of said housing adjacent said air stream input opening, liquid discharge means secured to said housing wall, communicating with and about said wash liquid opening, and extending substantially the entire width of said wall to provide a broad forceful stream of wash liquid in a wide torrent at a relatively low velocity to create considerable turbulence with the air stream entering said wash section through said input opening, whereby said forceful stream and turbulence will form a substantially large volume of liquid particles in said wash section to trap particulate matter in said air stream, adjustable baffle members secured to at least one of said walls below said wash liquid opening, to effect a controlled air stream dampering action thereon, and means for individually adjusting said baffle members with respect to said air stream, said baffle members extending substantially from one side wall to the other side wall of said housing and partially transversely the horizontal cross-sectional area thereof to provide surfaces for impingement thereon of said turbulent stream of air and wash liquid entrapped particulate matter, pump means communicating with a source of wash liquid and with said liquid discharge means to provide said wash liquid to said wash section, a settling tank section defined by a housing conjoined to and communicating with said wash section housing through said wash section discharge opening, said settling tank housing having a tank portion for collection of said wash liquid and solid and particulate matter discharged thereinto, said wash section discharge opening extending upwardly from the level of the wash liquid in said settling tank to the lower edge of said wash section wall at said discharge opening therethrough, a moisture eliminator section communicating with said wash section and said settling tank section, conjoined to and disposed vertically and relatively closely above the liquid level in said settling tank portion, and extending substantially entirely across the area of said settling tank section for discharge of wash liquid entrapped particulate matter into said settling tank section therebelow, comprising a housing having at least two substantially horizontal banks of moisture eliminator vanes supported therein, said banks of vanes being spaced vertically and substantially apart from each other and extending throughout the horizontal cross-sectional area of said moisture eliminator section housing, said wash section discharge opening providing a passage for said wash liquid laden air stream between said wash section and said moisture eliminator section above the level of said wash liquid in said settling tank and wash sections, and a suction fan section communicating with said moisture eliminator section at the air stream discharge port thereof, said suction fan section being free of air stream dampering at its inlet and outlet ports, and having a power driven fan unit operable at full rated capacity when said apparatus is in use.

2. The apparatus defined in claim 1, wherein selected of said wash section housing walls are provided with vertically spaced apart bracket members mounted thereon adjacent the lateral edges of said walls to support said baffle members.

3. The apparatus defined in claim 2, and wherein each said baffle member is provided with supporting means secured thereto and pivotable in horizontally aligned said bracket members for vertical swinging movement of its distal edge.

4. The apparatus defined in claim 3, and including lift members secured to said baffle members for adjustably pivoting the same into air stream dampering posture, and wall affixed pin or hook members engageable by said lift members for fixing the pivoted posture of said baffle members.

5. The apparatus defined in claim 4, wherein said lift members comprise link chains.

6. The apparatus defined in claim 2, wherein said baffle members comprise a bank of vertically disposed, substantially parallel, spaced apart, longitudinally corrugated solid sheets of material, secured together into a unit extending substantially from one lateral wall to the opposite lateral wall of said wash section housing, fastening means securing said baffle members in said spaced apart, substantially parallel attitude, and means to support said bank of baffle members upon said bracket members intermediate said wash solution and lower discharge openings, said bank of baffle members extending substantially across the transverse horizontal cross-sectional area of said wash section housing.

7. The apparatus defined in claim 2, wherein each said baffle member comprises an air comb comprising a horizontally disposed supporting bar member pivotally supported in horizontally aligned said bracket members, a plurality of comb rods secured at their proximal ends to said bar member and extending therefrom at an angle substantially normal thereto, a pivoting lever affixed to said bar member adjacent one end thereof, and lift means secured to said pivoting lever for pivoting said air comb into said air stream dampering posture.

8. The apparatus defined in claim 7, wherein said comb rods are arranged in staggered relationship on each side of said bar member.

9. The apparatus defined in claim 7, wherein said arm comb comprises a plurality of supporting bar members arranged in parallel spaced apart relationship and secured together by connecting members affixed thereto, each of said supporting bar members having a plurality of comb rods secured thereto, said pivoting lever being affixed to one of said supporting bar members.

10. The apparatus defined in claim 1, wherein one or more lateral walls of said wash section housing are provided with a glazed window therein for visual inspection of the operational functioning of said wash section.

11. The apparatus defined in claim 1, wherein said wash section housing comprises a unitary structure.

12. The apparatus defined in claim 1, wherein said wash section housing is complementary with said settling tank and moisture eliminator housings.

13. The apparatus defined in claim 1, wherein each said baffle member comprises a flat planar solid sheet of material having supporting means therefor affixed adjacent one of its longitudinal edges.

14. The apparatus defined in claim 1, wherein each said baffle member comprises a flat planar perforated sheet of material having supporting means therefor affixed adjacent one of its longitudinal edges.

15. The apparatus defined in claim 1, wherein each said baffle member comprises a transversely arcuately formed sheet of material having supporting means therefor affixed adjacent one of its longitudinal edges.

16. The apparatus defined in claim 1, wherein each said baffle member comprises a flat planar screen having supporting means therefor affixed adjacent one of its longitudinal edges.

17. The apparatus defined in claim 1, wherein each said baffle member comprises a longitudinally corrugated solid sheet of material having supporting means therefor affixed adjacent one of its longitudinal edges.

18. The apparatus defined in claim 1, wherein said pump means comprises a power driven pump, a conduit connected to said pump and communicating with said source of wash liquid and terminating in a discharge nozzle communicating with said wash liquid opening in said wash section housing.

19. The apparatus defined in claim 1, wherein said settling tank housing communicates with and receives liquid and particulate matter from said moisture eliminator section thereabove.

20. The apparatus defined in claim 1, wherein said settling tank housing is common with said moisture eliminator section housing.

21. The apparatus defined in claim 1, wherein said moisture eliminator vanes are spaced relatively closely together and point in the same direction toward the side of said moisture eliminator section housing from which the wash liquid laden air stream enters the same, to form a convoluted air flow pattern from the open region therebelow and therethrough.

22. The apparatus defined in claim 21, wherein
the lowermost bank of vanes is inclined somewhat downwardly from the side of said moisture eliminator section housing at which the wash liquid laden air stream enters to the opposite side of said latter housing, to more uniformly distribute said air stream in the region below said lowermost bank of vanes for passage thereinto and therethrough.

23. The apparatus defined in claim 1, wherein
said banks of vanes comprise two said banks secured in said moisture eliminator section housing and defining lower, intermediate and upper open regions in said moisture eliminator section.

24. The apparatus defined in claim 23, wherein
the upper of said two banks of vanes is spaced apart from and below said air stream discharge port in said moisture eliminator section housing to provide said upper open region.

25. The apparatus defined in claim 1, and including a conduit connecting said moisture eliminator section at its air stream discharge port to said suction fan section.

26. The apparatus defined in claim 1, and including a glazed window in at least one lateral wall of said moisture eliminator section housing for visual inspection of the operational functioning of said moisture eliminator section.

27. The apparatus defined in claim 1, and wherein
frame members are provided for each said bank of angulated vanes and secured to opposite walls of said moisture eliminator section housing, supporting said vanes at their longitudinal ends.

28. The apparatus defined in claim 1, and including an air comb pivotally mounted in said moisture eliminator section adjacent its wash liquid laden air stream inlet and disposed in the path of said air stream,
air comb supporting brackets affixed to said moisture eliminator section housing,
said air comb comprising
 a supporting bar member pivotally supported in said supporting brackets,
 a plurality of comb rods secured at their proximal ends to said bar member and extending therefrom at an angle substantially normal thereto,
 a pivoting lever affixed to said bar member adjacent one end thereof,
and lift means secured to said pivoting lever for pivoting said air comb into the path of said incoming air stream to agglomerate solid and particulate matter upon said comb rods and at a posture such that said agglomerated matter is swept from said comb rods by said air stream.

29. The apparatus defined in claim 28, wherein
said comb rods are arranged in staggered relationship on each side of said bar member.

30. The apparatus defined in claim 28, wherein
said air comb comprises a plurality of supporting bar members arranged in parallel spaced apart relationship and secured together by connecting members affixed thereto,
each of said supporting bar members having a plurality of comb rods secured thereto,
said pivoting lever being affixed to one of said supporting bar members.

31. The apparatus defined in claim 1, and including a sludge conveyor section conjoined to and communicating with said settling tank section in the lower region thereof for removal of collected solid and particulate matter therefrom.

32. The apparatus defined in claim 1, wherein
said baffle members are removably secured to said at least one of said wash section walls.

33. An air cleaning apparatus for removing solid and particulate matter from a contaminated air stream introduced to the apparatus at a relatively high input velocity by comparison to the relatively low input velocity of wash liquid injected into said air stream in said apparatus, the combination comprising
a plurality of wash sections each comprising
 a housing having conjoined front, rear, bottom and lateral walls, an input opening at the upper end of said housing for said contaminated air stream and an opening adjacent the lower end of said housing through a wall thereof for discharge of said air stream and wash liquid introduced into said wash section,
 a wash liquid opening through and extending substantially the entire width of a wall of said housing adjacent said air stream input opening,
 liquid discharge means secured to said housing wall, communicating with and about said wash liquid opening, and extending substantially the entire width of said wall to provide a broad forceful stream of wash liquid in a wide torrent at a relatively low velocity to create considerable turbulence with the air stream entering said wash section through said input opening, whereby said forceful stream and turbulence will form a substantially large volume of liquid particles in said wash section to trap particulate matter in said air stream,
 adjustable baffle members secured to at least one of said walls below said wash liquid opening, to effect a controlled air stream dampering action thereon,
 and means for individually adjusting said baffle members with respect to said air stream,
 said baffle members extending substantially from one side wall to the other side wall of said housing and partially transversely the horizontal cross-sectional area thereof to provide surfaces for impingement thereon of said turbulent stream of air and wash liquid entrapped particulate matter,
pump means communicating with a source of wash liquid and with said liquid discharge means to provide said wash liquid to said wash section,
a settling tank section defined by a housing conjoined to and communicating with said wash section housing through said wash section discharge opening,
said settling tank housing having a tank portion for collection of said wash liquid and solid and particulate matter discharged thereinto,
said wash section discharge opening extending upwardly from the level of the wash liquid in said settling tank to the lower edge of said wash section wall at said discharge opening therethrough, a moisture eliminator section communicating with said wash sections and said settling tank section, conjoined to and disposed vertically and relatively closely above the liquid level in said settling tank section, and extending substantially entirely across the area of said settling tank section for discharge of wash liquid entrapped particulate matter into said settling tank section therebelow, comprising
a housing having at least two substantially horizontal banks of moisture eliminator vanes supported therein, said banks of vanes being spaced vertically and substantially apart from each other and extending throughout the horizontal cross-sectional area of said moisture eliminator section housing,
a conduit connected to each said wash section and communicating with each said wash section discharge opening, and connected to and communicating with said settling tank and moisture eliminator sections through an entry port thereinto providing a passage for said wash liquid laden air stream into the moisture eliminator section above the level of wash liquid in said settling tank section,
and a suction fan section communicating with said moisture eliminator section at the air stream discharge port thereof,
said suction fan section being free of air stream dampering at its inlet and outlet ports, and having a power driven fan unit operable at full rated capacity when said apparatus is in use,
said wash sections and suction fan section being disposed at positions relatively removed from said settling tank and moisture eliminator sections.

34. The apparatus defined in claim 33, wherein
said conduit connected to each said wash section and communicating with said air stream discharge opening in the lower region of each said wash section housing is connected to and communicates with said settling tank and moisture eliminator sections above and below the liquid level in said settling tank.

35. The apparatus defined in claim 33, wherein
selected of said wash section housing walls are provided with vertically spaced apart bracket members mounted thereon adjacent the lateral edges of said walls to support said baffle members.

36. The apparatus defined in claim 35, wherein
each said baffle member is provided with supporting means secured thereto and pivotable in horizontally aligned said bracket members for vertical swinging movement of its distal edge.

37. The apparatus defined in claim 36, and including lift members secured to said baffle members for adjustably pivoting the same into air stream dampering posture, and wall affixed pin or hook members engageable by said lift members for fixing the pivoted posture of said baffle members.

38. The apparatus defined in claim 37, wherein
said lift members comprise link chains.

39. The apparatus defined in claim 35, wherein
said baffle members comprise
a bank of vertically disposed, substantially parallel, spaced apart, longitudinally corrugated solid sheets of material, secured together into a unit extending substantially from one lateral wall to the opposite lateral wall of each said wash section housing,
fastening means securing said baffle members in said spaced apart, substantially parallel attitude,
and means to support said bank of baffle members upon said bracket members intermediate said wash solution and lower discharge openings,
said bank of baffle members extending substantially across the transverse horizontal cross-sectional area of each said wash section housing.

40. The apparatus defined in claim 35, wherein
each said baffle member comprises
an air comb comprising
a horizontally disposed supporting bar member pivotally supported in horizontally aligned said bracket members,
a plurality of comb rods secured at their proximal ends to said bar member and extending therefrom at an angle substantially normal thereto, a pivoting lever affixed to said bar member adjacent one end thereof,
and lift means secured to said pivoting lever for pivoting said air comb into said air stream dampering posture.

41. The apparatus defined in claim 40, wherein
said comb rods are arranged in staggered relationship on each side of said bar member.

42. The apparatus defined in claim 40, wherein
said air comb comprises a plurality of supporting bar members arranged in parallel spaced apart relationship and secured together by connecting members affixed thereto,
each of said supporting bar members having a plurality of comb rods secured thereto,
said pivoting lever being affixed to one of said supporting bar members.

43. The apparatus defined in claim 33, wherein
one or more lateral walls of each said wash section housing are provided with a glazed window therein for visual inspection of the operational functioning of each said wash section.

44. The apparatus defined in claim 33, wherein
each said wash section housing comprises a unitary structure.

45. The apparatus defined in claim 33, wherein
each said baffle member comprises
a flat planar solid sheet of material having supporting means therefor affixed adjacent one of its longitudinal edges.

46. The apparatus defined in claim 33, wherein
each said baffle member comprises
a flat planar perforated sheet of material having supporting means therefor affixed adjacent one of its longitudinal edges.

47. The apparatus defined in claim 33, wherein
each said baffle member comprises
a transversely arcuately formed sheet of material having supporting means therefor affixed adjacent one of its longitudinal edges.

48. The apparatus defined in claim 33, wherein
each said baffle member comprises
a flat planar screen having supporting means therefor affixed adjacent one of its longitudinal edges.

49. The apparatus defined in claim 33, wherein
each said baffle member comprises a longitudinally corrugated solid sheet of material having supporting means therefor affixed adjacent one of its longitudinal edges.

50. The apparatus defined in claim 70, wherein said pump means comprises
a power driven pump,
a conduit connected to said pump and communicating with said source of wash liquid and terminating in a discharge nozzle communicating with said wash liquid opening in each said wash section housing.

51. The apparatus defined in claim 33, wherein said settling tank housing communicates with and receives liquid and particulate matter from said moisture eliminator section thereabove.

52. The apparatus defined in claim 33, wherein said settling tank housing is common with said moisture eliminator section housing.

53. The apparatus defined in claim 33, wherein said moisture eliminator vanes are spaced relatively closely together and point in the same direction toward the side of said moisture eliminator section housing from which the wash liquid laden air stream enters the same, to form a convoluted air flow pattern from the open region therebelow and therethrough.

54. The apparatus defined in claim 53, wherein the lowermost bank of vanes is inclined somewhat downwardly from the side of said moisture eliminator section housing at which the wash liquid laden air stream enters to the opposite side of said latter housing, to more uniformly distribute said air stream in the region below said lowermost bank of vanes for passage thereinto and therethrough.

55. The apparatus defined in claim 33, wherein said banks of vanes comprise two said banks secured in said moisture eliminator section housing and defining lower, intermediate and upper open regions in said moisture eliminator section.

56. The apparatus defined in claim 55, wherein the upper of said two banks of vanes is spaced apart from and below said air stream discharge port in said moisture eliminator section housing to provide said upper open region.

57. The apparatus defined in claim 33, and including
a conduit connecting said moisture eliminator section at its air stream discharge port to said suction fan section.

58. The apparatus defined in claim 33, and including a glazed window in at least one lateral wall of said moisture eliminator section housing for visual inspection of the operational functioning of said moisture eliminator section.

59. The apparatus defined in claim 33, and including an air comb pivotally mounted in said moisture eliminator section adjacent its wash liquid laden air stream inlet and disposed in the path of said air stream,
air comb supporting brackets affixed to said moisture eliminator section housing,
said air comb comprising
a supporting bar member pivotally supported in said supporting brackets,
a plurality of comb rods secured at their proximal ends to said bar member and extending therefrom at an angle substantially normal thereto,
a pivoting lever affixed to said bar member adjacent one end thereof,
and lift means secured to said pivoting lever for pivoting said air comb into the path of said incoming air stream to agglomerate solid and particulate matter upon said comb rods and at a posture such that said agglomerated matter is swept from said comb rods by said air stream.

60. The apparatus defined in claim 59, wherein said comb rods are arranged in staggered relationship on each side of said bar member.

61. The apparatus defined in claim 59, wherein said air comb comprises a plurality of supporting bar members arranged in parallel spaced apart relationship and secured together by connecting members affixed thereto,
each of said supporting bar members having a plurality of comb rods secured thereto,
said pivoting lever being affixed to one of said supporting bar members.

62. The apparatus defined in claim 33, and including a sludge conveyor section conjoined to and communicating with said settling tank section in the lower region thereof for removal of collected solid and particulate matter therefrom.

63. The apparatus defined in claim 33, wherein said baffle members are removably secured to said at least one of said wash section walls.

* * * * *